United States Patent
Wang et al.

(10) Patent No.: US 12,413,366 B2
(45) Date of Patent: Sep. 9, 2025

(54) SYSTEMS AND METHODS FOR SOUNDING REFERENCE SIGNAL TRANSMISSION

(71) Applicant: ZTE CORPORATION, Guangdong (CN)

(72) Inventors: Yuxin Wang, Shenzhen (CN); Hao Wu, Shenzhen (CN); Zhaohua Lu, Shenzhen (CN); Chuangxin Jiang, Shenzhen (CN); Yong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 121 days.

(21) Appl. No.: 18/470,170

(22) Filed: Sep. 19, 2023

(65) Prior Publication Data

US 2024/0022379 A1   Jan. 18, 2024

Related U.S. Application Data

(63) Continuation of application No. PCT/CN2021/082041, filed on Mar. 22, 2021.

(51) Int. Cl.
*H04L 5/00* (2006.01)

(52) U.S. Cl.
CPC .......... *H04L 5/0051* (2013.01); *H04L 5/0012* (2013.01)

(58) Field of Classification Search
CPC ... H04L 5/0012; H04L 5/0048; H04L 5/0094; H04L 5/0053
See application file for complete search history.

(56) References Cited

U.S. PATENT DOCUMENTS

| | | | |
|---|---|---|---|
| 12,149,319 B2* | 11/2024 | Wang | H04L 5/0094 |
| 2011/0013546 A1 | 1/2011 | Hao et al. | |
| 2019/0268185 A1 | 8/2019 | Wang et al. | |
| 2022/0232535 A1* | 7/2022 | Abdelghaffar | H04L 5/0012 |
| 2023/0246792 A1* | 8/2023 | Wang | H04L 5/0094 370/329 |
| 2023/0254832 A1* | 8/2023 | Sen | H04L 5/0051 370/329 |
| 2024/0031097 A1* | 1/2024 | Go | H04L 5/0094 |
| 2024/0080145 A1* | 3/2024 | Nilsson | H04L 25/0224 |

FOREIGN PATENT DOCUMENTS

| | | |
|---|---|---|
| CN | 108111282 A | 6/2018 |
| CN | 109104266 A | 12/2018 |
| CN | 109923828 A | 6/2019 |
| CN | 110167186 A | 8/2019 |
| CN | 110463124 A | 11/2019 |

(Continued)

OTHER PUBLICATIONS

First Office Action for CN Appl. No. 202180096206.7, dated Aug. 24, 2024 (with English translation, 16 pages).

(Continued)

*Primary Examiner* — Shukri Taha
(74) *Attorney, Agent, or Firm* — Foley & Lardner LLP

(57) ABSTRACT

Presented are systems and methods for sounding reference signal (SRS) transmission. A wireless communication device may receive configuration information for SRS transmission from a wireless communication node. The wireless communication device may transmit a SRS to the wireless communication node according to the configuration information.

20 Claims, 4 Drawing Sheets

(56) References Cited

FOREIGN PATENT DOCUMENTS

| WO | WO-2020164323 A1 | * | 8/2020 | ............. | H04L 5/001 |
| WO | WO-2020/197335 A1 | | 10/2020 | | |

OTHER PUBLICATIONS

Extended European Search Report for EP App. No. 21932008.2, dated Jun. 24, 2024 (18 pages).

Huawei et al., "UL SRS design for beam management and CSI acquisition", 3GPP TSG RAN WG1 Meeting #90bis, R1-1717307, Oct. 13, 2017, Prague, Czech Republic (13 pages).

LG Electronics, "Enhancements on SRS flexibility, coverage and capacity", 3GPP TSG RAN WG1 #104-e, R1-2100623, Feb. 5, 2021, e-Meeting (7 pages).

Nokia et al., "Enhancements on SRS flexibility, Coverage and Capacity", 3GPP TSG RAN WG1 #104-e, R1-2101010, Feb. 5, 2021, e-meeting (19 pages).

Tayyab, M. et al., "Uplink Reference Signals for Power-Efficient Handover in Cellular Networks with Mobile Relays", IEEE Access, vol. 9, 2021, pp. 24446-24461.

International Search Report and Written Opinion for PCT Appl. No. PCT/CN2021/082041, mailed Dec. 8, 2021 (9 pages).

\* cited by examiner

Table 1: The offset $k_{\text{offset}}^{l'}$ for SRS as a function of $K_{TC}$ and $l'$.

| $K_{TC}$ | $N_{\text{symb}}^{\text{SRS}} = 1$ | $N_{\text{symb}}^{\text{SRS}} = 2$ | $k_{\text{offset}}^0, \ldots, k_{\text{offset}}^{N_{\text{symb}}^{\text{SRS}}-1}$ $N_{\text{symb}}^{\text{SRS}} = 4$ | $N_{\text{symb}}^{\text{SRS}} = 8$ | $N_{\text{symb}}^{\text{SRS}} = 12$ |
|---|---|---|---|---|---|
| 2 | 0 | 0,1 | 0,1,0,1 | - | - |
| 4 | - | 0,2 | 0,2,1,3 | 0,2,1,3,0,2,1,3 | 0,2,1,3,0,2,1,3,0,2,1,3 |
| 8 | - | - | 0,4,2,6 | 0,4,2,6,1,5,3,7 | 0,4,2,6,1,5,3,7,0,4,2,6 |

SYSTEMS AND METHODS FOR SOUNDING REFERENCE SIGNAL TRANSMISSION

CROSS-REFERENCE TO RELATED APPLICATION

This application claims the benefit of priority under 35 U.S.C. § 120 as a continuation of PCT Patent Application No. PCT/CN2021/082041, filed on Mar. 22, 2021, the disclosure of which is incorporated herein by reference in its entirety.

TECHNICAL FIELD

The disclosure relates generally to wireless communications, including but not limited to systems and methods for sounding reference signal (SRS) transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive configuration information for sounding reference signal (SRS) transmission from a wireless communication node. The wireless communication device may transmit a SRS to the wireless communication node according to the configuration information.

In some embodiments, the wireless communication device may determine, according to an offset parameter ($n_{offset}$) and a partial frequency factor ($P_F$), a starting position in frequency domain for transmitting the SRS as a partial frequency SRS transmission. In some embodiments, the wireless communication device may determine the starting position as a function of a ratio of the $n_{offset}$ and the $P_F$. In some embodiments, the wireless communication device may determine a value of the $P_F$ from a predetermined list of values. In some embodiments, the wireless communication device may determine a value of the $P_F$ by receiving, via higher layer signaling, a configuration indicating a plurality of candidate values. In some embodiments, the wireless communication device may determine a value of the $P_F$ by receiving downlink control information (DCI) indicating the value of the $P_F$ from the plurality of candidate values.

In some embodiments, the wireless communication device may determine the $P_F$ to have a value of 1, in the absence of higher layer signaling providing one or more candidate values for the $P_F$. In some embodiments, the wireless communication device may determine a value of the $n_{offset}$ from a predetermined list, such as $\{0, 1, \ldots, P_F-1\}$. In some embodiments, the wireless communication device may determine a value of the $n_{offset}$ from higher layer signaling. In some embodiments, the wireless communication device may determine a value of the $n_{offset}$ by receiving, via higher layer signaling, a configuration indicating a plurality of candidate values. In some embodiments, the wireless communication device may determine a value of the off set by receiving downlink control information (DCI) indicating the value of the $n_{offset}$ from the plurality of candidate values. In some embodiments, the wireless communication device may determine the $n_{offset}$ to have a value of 0, in the absence of higher layer signaling providing one or more candidate values for the $n_{offset}$.

In some embodiments, the wireless communication device may determine at least one value of the $n_{offset}$ according to a hopping pattern at a granularity of symbol level, slot level, resource level, resource set level or frequency hopping period in time domain, the hopping pattern represented by: $n_{offset} = (n'_{offset} + k') \bmod P_F$. In some embodiments, the $n'_{offset}$ may be an offset component configured via radio resource configuration (RRC) signaling. In some embodiments, k' may be a hopping sequence value. In some embodiments, the k' may change according to a hopping sequence of $\{0, 1\}$ if $P_F$ is equal to 2. In some embodiments, the k' may change according to a hopping sequence of $\{0, 2, 1\}$ if $P_F$ is equal to 3. In some embodiments, the k' may change according to a hopping sequence of $\{0, 2, 1, 3\}$ if $P_F$ is equal to 4. In some embodiments, the k' may change according to a hopping sequence of $\{0, 4, 2, 6, 1, 5, 3, 7\}$ if $P_F$ is equal to 8. In some embodiments, if the hopping pattern associated with the $n_{offset}$ is at a granularity of the frequency hopping period in time domain, a change in the k' may occur after SRS transmissions have undergone a whole round of hopping in frequency domain.

In some embodiments, the wireless communication device may transmit a reporting message to the wireless communication node prior to receiving the configuration information. In some embodiments, the reporting message may indicate a capability of the wireless communication device. In some embodiments, the capability may include supporting triggering offset enhancement to determine a SRS transmission slot according to a reference slot within which downlink control information (DCI) that triggers the SRS is received. In some embodiments, triggering offset enhancement may be used. When triggering offset enhancement is used, the reporting message may include an indication of whether the wireless communication device supports a defined triggering offset being configured with at least one non-zero value. In some embodiments, the reporting message may exclude any indication of support for the defined triggering offset being configured with at least one non-zero value. When the reporting message excludes any indication of support for the defined triggering offset being configured with at least one non-zero value, the defined triggering offset may be configured using a zero value. In some embodiments, the reporting message may include an indication of support for the defined triggering offset being configured with at least one non-zero value. When the reporting message includes an indication of support for the defined triggering offset being configured with at least one non-zero value, the defined triggering offset may be configured using a non-zero value. In some embodiments, the reporting message may include a maximum number of values of a slot offset (t) for a resource set. In some embodiments, the reporting message may include a maximum value of the t for the resource set. In some embodiments, a SRS resource set may be transmitted in a (t+1)-th available slot relative to the reference slot.

In some embodiments, downlink control information (DCI) may support options of using an unused field and using a dedicated field, to indicate at least one value of a slot offset (t) for a resource set. In some embodiments, the wireless communication device may ignore the unused field, if the dedicated field is configured to indicate the at least one value of the t. In some embodiments, the wireless communication device may ignore the dedicated field, if the unused field is configured to indicate the at least one value of the t. In some embodiments, the reporting message may include at least one of: a maximum number of configured resource sets (N_max), or a number of supported values for a number of resource sets (N) to be configured by the wireless communication device, where N≤N_max. In some embodiments, the reporting message may include a maximum number of repetition symbols across which the wireless communication device can maintain phase continuity. In some embodiments, the reporting message may include at least one of: a maximum value of a partial frequency factor ($P_F$), a maximum comb value, or a maximum value of power boosting.

In some embodiments, the wireless communication device may be expected to receive a same transmit power control (TPC) command between SRS repetition symbols. In some embodiments, the wireless communication device may be expected to receive a same transmit power control (TPC) command between SRS resources in a same SRS resource set. In some embodiments, the wireless communication device may be expected to receive a same transmit power control (TPC) command between different SRS resource sets when a usage parameter of the wireless communication device is configured via higher layer signaling as 'antennaSwitching'. In some embodiments, the configuration information can be received from the wireless communication node via radio resource control (RRC) signaling, medium access control control element (MAC CE) signaling or downlink control information (DCI) transmission. In some embodiments, the configuration information may include an indication of: a total number of OFDM symbols in one SRS resource (N_symbol), and a repetition factor (R), a ratio of N_symbol and R provides an integer value. In some embodiments, the configuration information may be received from the wireless communication node via radio resource control (RRC) signaling. In some embodiments, the RRC signaling may include an indicator to associate one of a plurality of transmission switching configurations to at least one SRS resource or SRS resource set.

At least one aspect is directed to a system, method, apparatus, or a computer-readable medium. A wireless communication node may transmit configuration information for sounding reference signal (SRS) transmission to a wireless communication device. The wireless communication node may receive a SRS, according to the configuration information, from the wireless communication device.

In some embodiments, a frequency-domain starting position $k_0^{(p_i)}$ may be defined/configured/determined according to (or based on):

$$k_0^{(p_i)} = \overline{k}_0^{(p_i)} + \sum_{b=0}^{B_{SRS}} K_{TC} M_{sc,b}^{SRS} n_b + n_{offset} m_{SRS,B_{SRS}} N_{SC}^{RB}/P_F$$

The wireless communication device may report/indicate/specify/inform whether the wireless communication device supports a defined triggering offset (e.g., legacy triggering offset) to be configured as non-zero values when a triggering offset enhancement is used. The triggering offset enhancement can be used to determine/configure a SRS transmission slot. In some embodiments, the wireless communication device may report/indicate a maximum number of repetition symbols to maintain phase continuity. In some embodiments, the wireless communication device may report/indicate a maximum value of power boosting for RPFS and/or a maximum comb value. In some embodiments, the wireless communication device may report at least one of: a maximum value of a partial frequency factor (max_$P_F$), a maximum comb value, and/or a maximum value of power boosting. In some embodiments, the wireless communication device may report/provide the max_$P_F$ and/or a maximum comb value. In some embodiments, a TPC command in the DCI can be used for SRS power control, to avoid large fluctuations/variations of SRS power between symbols, resources, and/or resource sets.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates a table with example values to configure an offset $k_{offset}^{1'}$ for a sounding reference signal, in accordance with some embodiments of the present disclosure.

DETAILED DESCRIPTION

1. Mobile Communication Technology and Environment

Figure 1:
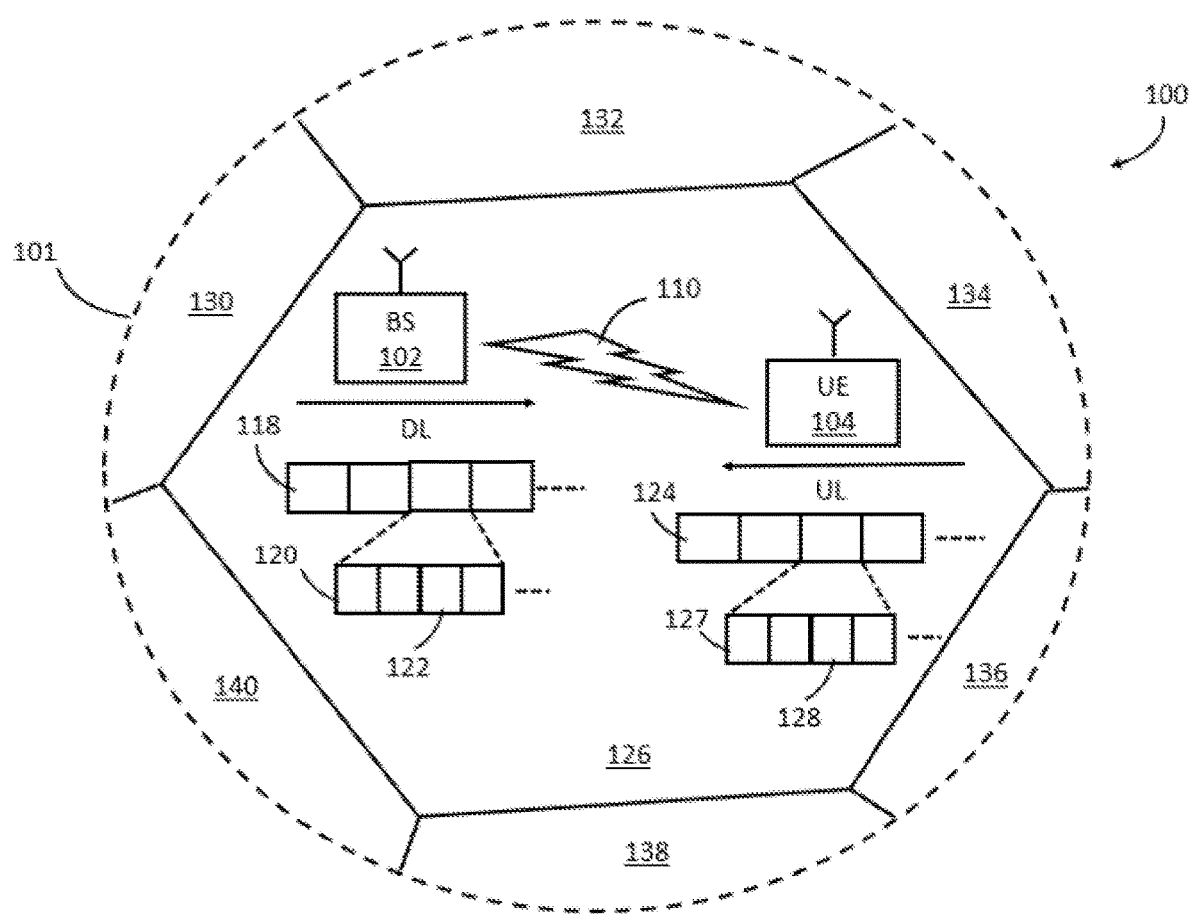
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
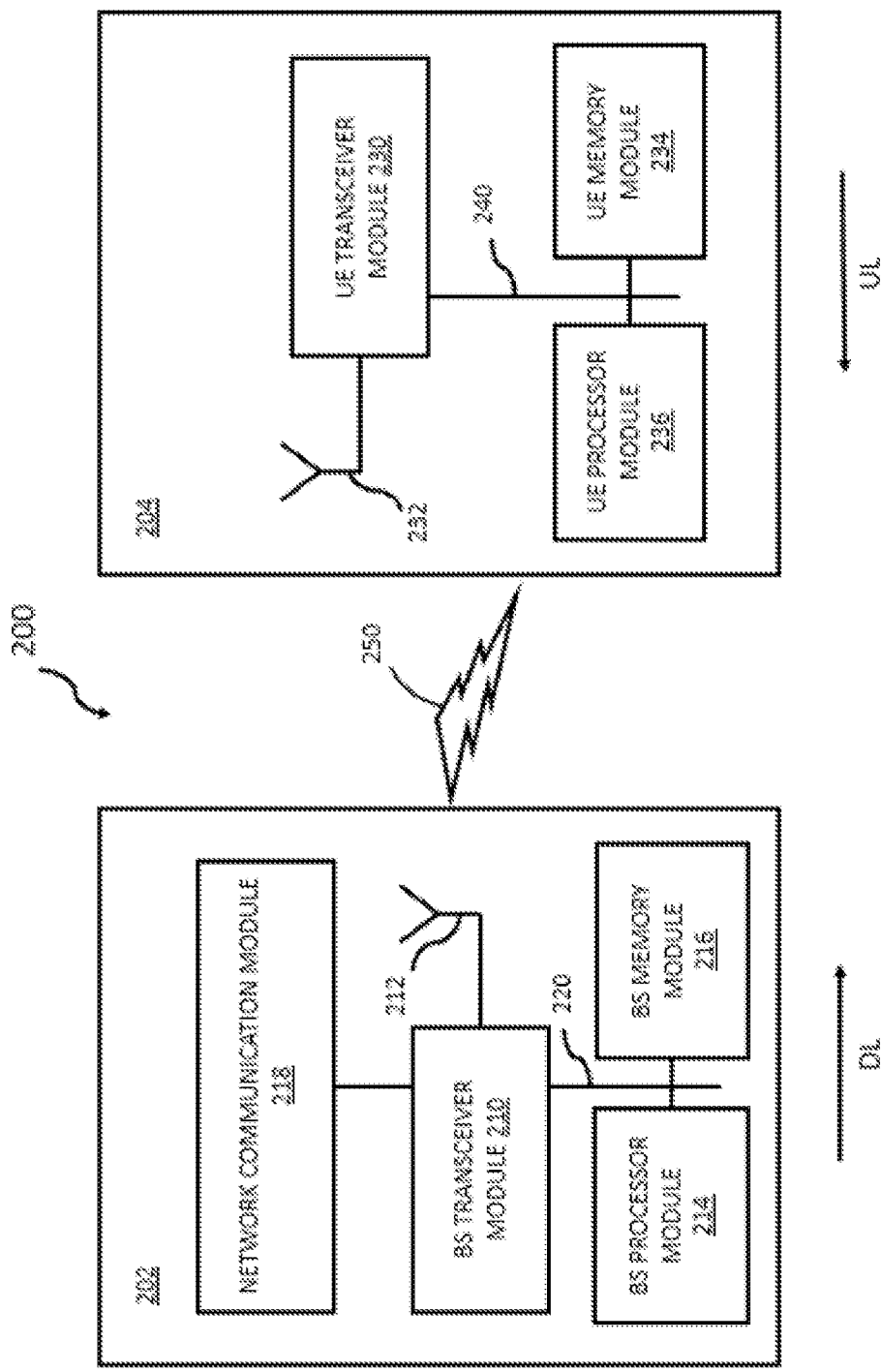
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Reporting Channel State Information

In certain systems (e.g., Rel-17 new radio (NR), next generation (NG) systems, and/or other systems), a plurality of wireless communication devices (e.g., a UE, a terminal, and/or a served node) can be located in a serving cell. The plurality of wireless communication devices may receive/obtain a signal from a wireless communication node (e.g., a central processing unit (CPU), a ground terminal, a base station, a gNB, an eNB, a transmission-reception point (TRP), a network (NW), or a serving node). In some embodiments, the plurality of wireless communication devices (e.g., one or more UEs) may send/transmit/broadcast a signal (e.g., a sounding reference signal and/or other signals) to the wireless communication node. A sounding reference signal (SRS) can be used to measure/quantify channel state information (CSI) of a channel between the wireless communication node and at least one wireless communication device. The CSI (and/or other information) can be used to enhance a throughput of the cell. Therefore, the flexibility, coverage, and/or capacity of the SRS may be enhanced to improve the throughput of the cell.

In certain systems (e.g., long-term evolution (LTE) systems and/or other systems), a wireless communication device may send/transmit/communicate/broadcast an uplink (UL) SRS on a last data symbol of a sub-frame. The wireless communication device may send/transmit the UL SRS (e.g., on the last data symbol of the sub-frame) based on (or according to) one or more parameters (e.g., a frequency band, a frequency domain position, a sequence cyclic shift, a period, a sub-frame offset and/or other parameters). The wireless communication node may indicate/provide/specify/configure/send the one or more parameters. In some embodiments, the wireless communication node may determine the CSI of one or more UL channels of the wireless communication device. The wireless communication node may determine the CSI of the UL channel(s) based on (or according to) a received SRS. In some embodiments, the wireless communication node may perform a plurality of operations (e.g. frequency selection scheduling and/or close-loop power control) according to (or by using) the determined CSI.

In certain systems (e.g., LTE release 10 and/or other systems), one or more non-precoding sounding reference signals (SRSs) may be used during UL communications/ transmissions (e.g., antenna dedicated SRS). A demodulation reference signal (DMRS) of a physical UL shared channel (PUSCH) can be used to perform precoding. The wireless communication node may receive/obtain the non-precoding SRS(s) to estimate original CSI. In some embodiments, the wireless communication node may be unable to estimate/acquire the CSI based on (or according to) the precoding DMRS. Under such a condition, the wireless communication device may consume/use additional SRS resources when using a plurality of antennas to transmit the non-precoding SRS(s). Therefore, the number of wireless communication devices that are multiplexing simultaneously may decrease within the system. In some embodiments, the SRS may be configured by using (or according to) higher layer signaling (e.g., type-0 trigger) and/or downlink control information (e.g., type-1 trigger). The SRS transmissions configured by using higher layer signaling (e.g., radio resource control (RRC) signaling, medium access control control element (MAC-CE) signaling, and/or other types of signaling) may be periodic, while SRS transmissions configured by using downlink control information (DCI) may be aperiodic. Certain systems (e.g., LTE-A release 10) may improve/enhance the utilization of the SRS resources and/or the flexibility of scheduling the SRS by using/configuring aperiodic SRS transmissions.

In certain systems (e.g., NR release 15), the usage of the SRS may be classified into at least four categories (or other numbers of categories). The at least four categories may include beam management, codebook based, non-codebook based, and/or antenna switching. Certain systems, such as NR, may support beam indication by informing the wireless communication device (e.g., UE) that a certain downlink (DL) transmission (e.g., physical downlink shared channel (PDSCH) transmission, physical downlink control channel (PDCCH) transmission, and/or other DL transmissions) uses a same/corresponding transmission beam as a configured reference signal (e.g., a CSI reference signal (CSI-RS) and/or a synchronization signal (SS) block). For example, beam indication may be supported by informing the wireless communication device that a certain PDSCH and/or PDCCH transmission is performed by using (or according to) a same spatial filter as the configured reference signal. Beam indication can be based on the configuration and/or downlink signaling of one or more transmission configuration indication (TCI) states. Each TCI state may include information about a reference signal (e.g., a CSI-RS and/or a SS block). By associating/relating/linking/mapping a DL transmission (e.g., a PDCCH and/or PDSCH transmission) with a TCI, the wireless communication node may instruct/inform the wireless communication device to assume that the DL transmission is performed by using a same/corresponding spatial filter as the reference signal associated with the TCI.

In some embodiments, a wireless communication node may be a base station. The base station can be a base station in a macro cell or small cell, and/or a transport point. In some embodiments, the wireless communication device can be a mobile phone, portable equipment, car, and/or satellite access node.

I. Scheme A

In some embodiments, one or more techniques may be considered to improve/enhance/increase the coverage of the SRS. The one or more techniques may include repetition (e.g., repetitive SRS transmissions), partial frequency SRS transmission (e.g., using less than a full amount of physical resource blocks (PRBs)), and/or SRS comb size extension. For partial frequency SRS transmissions, the wireless communication device (e.g., UE) can use power boosting (e.g., on an SRS sequence) to further enhance/improve the coverage of the SRS. In some embodiments, the wireless communication device may be configured to perform partial frequency SRS transmissions. If the wireless communication device is configured to perform partial frequency SRS transmissions, the wireless communication device may determine/configure/define a starting position in the frequency domain for transmitting the SRS as a partial frequency SRS transmission. The starting position may specify/indicate/provide a first position of a series/sequence of SRSs in the partial frequency SRS transmission. The wireless communication device may determine/configure/define the starting position $k_0^{(p_i)}$ as a function of a ratio of the $n_{offset}/P_F$. For instance, the wireless communication device may determine the starting position $k_0^{(p_i)}$ according to (or by using):

$$k_0^{(p_i)} = \bar{k}_0^{(p_i)} + \sum_{b=0}^{B_{SRS}} K_{TC} M_{sc,b}^{SRS} n_b + n_{offset} m_{SRS,B_{SRS}} N_{SC}^{RB}/P_F$$

or $$k_0^{(p_i)} = \bar{k}_0^{(p_i)} + \sum_{b=0}^{B_{SRS}} K_{TC} M_{sc,b}^{SRS} n_b + (k_F - 1) m_{SRS,B_{SRS}} N_{SC}^{RB}/P_F$$

where, $$\bar{k}_0^{(p_i)} = n_{shift} N_{sc}^{RB} + \left(k_{TC}^{(p_i)} + k'_{offset}\right) \bmod K_{TC}$$

or $$k_0^{(p_i)} = \bar{k}_0^{(p_i)} + \sum_{b=0}^{B_{SRS}} K_{TC} M_{sc,b}^{SRS} n_b$$

where $$\bar{k}_0^{(p_i)} = n_{shift} N_{sc}^{RB} + \left(k_{TC}^{(p_i)} + k'_{offset}\right) \bmod K_{TC} + n_{offset} m_{SRS,B_{SRS}} N_{SC}^{RB}/P_F$$

or $$\bar{k}_0^{(p_i)} = n_{shift} N_{sc}^{RB} + \left(k_{TC}^{(p_i)} + k'_{offset}\right) \bmod K_{TC} + (k_F - 1) m_{SRS,B_{SRS}} N_{SC}^{RB}/P_F$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, N_{SRS}^{cs,max} - 1\} \\ & \text{and } N_{ap}^{SRS} = 4 \text{ and } p_i \in \{1001, 1003\} \\ \bar{k}_{TC} & \text{otherwise} \end{cases}$$

If $N_{BWP}^{start} \le n_{shift}$, the reference point for the starting position $k_0^{(p_i)} = 0$ may include or correspond to subcarrier 0 in common resource block 0. Otherwise, the reference point for the starting position can be the lowest subcarrier of the bandwidth part (BWP). In some embodiments, the SRS may be configured by (or according to) the information element (IE) SRS-PosResource-r16 (or other higher layer parameters). If the SRS is configured by using SRS-PosResource-r16, the quantity $k_{offset}^{l'}$ may be configured according to Table 1 (see FIG. 3). If the SRS is not configured by using SRS-PosResource-r16, the quantity $k_{offset}^{l'}$ may correspond to a value of 0 (e.g., $k_{offset}^{l'}=0$).

The frequency domain shift value n shift may be used to adjust/modify the SRS allocation with respect to the reference point grid. In some embodiments, a higher layer parameter of an IE may include/provide/specify the frequency domain shift value n shift. For instance, the frequency domain shift value may be included/provided/specified in the higher layer parameter freqDomainShift of SRS-Resource and/or SRS-PosResource-r16 (or other IEs). In some embodiments, the transmission comb offset $\bar{k}_{TC} \in \{0, 1, \ldots, K_{TC}-1\}$ may be included/provided/specified in a higher layer parameter, such as transmissionComb, of an IE (e.g., SRS-Resource, SRS-PosResource-r16, or other IEs). In some embodiments, the parameter rib may specify/provide/indicate a frequency position index.

In some embodiments, the wireless communication device may obtain/acquire/receive/determine a value of the partial frequency factor ($P_F$). The value of the $P_F$ can be configured by the wireless communication node (or other entities of the wireless communication network). In some embodiments, the wireless communication device may determine the value of the $P_F$ according to (or based on) at least one of the following methods:

1) The wireless communication device may determine the value of the $P_F$ from a predetermined list of values. For instance, the wireless communication device may determine the value of the $P_F$ is at least one value from {2, 3, 4, 8} and/or {2, 4, 8} (or other lists of predetermined values). For instance, the wireless communication device and/or the wireless communication node may predetermine the value of the $P_F$ corresponds to 2.
2) The wireless communication device may determine the value of the $P_F$ by receiving/obtaining a configuration indicating a plurality of candidate values. The wireless communication device may receive the configuration via higher-layer signaling (e.g., RRC signaling and/or MAC-CE signaling). Responsive to receiving the configuration, the wireless communication device may select/determine/identify at least one value from the plurality of candidate values according to (or based) on a received DCI. The DCI may indicate/provide/specify the value of the $P_F$ from the plurality of candidate values.
3) In some embodiments, the value of the $P_F$ may not be configured with a plurality of candidate values and/or at least one value (e.g., indicated by higher layer parameter/signaling). Therefore, the wireless communication device may determine the $P_F$ to have a value of 1 (e.g., in the absence of higher layer signaling providing one or more candidate values for the $P_F$).

The parameter offset may indicate/specify the frequency domain shift value for partial frequency SRS transmission. In some embodiments, the value of the $n_{offset}$ can be configured by the wireless communication node (or other entities of the wireless communication network). The wireless communication device may obtain/determine the value of the offset according to (or by using) at least one of following methods:

1) The wireless communication device may determine/configure/identify/select the value of the $n_{offset}$ according to (or based on) higher layer signaling. For instance, the $n_{offset}$ may be configured with at least one value of $n_{offset} \in \{0, 1, \ldots, P_F-1\}$ from higher layer signaling (e.g., RRC signaling, or other types of signaling).
2) The wireless communication device may determine the value of the $n_{offset}$ from a predetermined list of values, such as $n_{offset} \in \{0, 1, \ldots, P_F-1\}$. For instance, the wireless communication device and/or the wireless communication node may predetermine the value of the $n_{offset}$ corresponds to 0 or $P_F-1$.
3) The wireless communication device may determine the value of the $n_{offset}$ by receiving, via higher layer signaling (e.g., RRC and/or MAC-CE signaling), a configuration indicating a plurality of candidate values. For instance, the wireless communication device may determine at least one value of the $n_{offset}$ from the plurality of candidate values indicated by the received configuration. Responsive to receiving the configuration (e.g., the plurality of candidate values), the wireless communication device may determine the value of the offset according to (or by using) a DCI. For example, the wireless communication device may receive the DCI, wherein the DCI can indicate/provide/specify the value of the $n_{offset}$ from the plurality of candidate values.
4) In some embodiments, the value of the offset (and/or $P_F$) may not be configured with a plurality of candidate values and/or at least one value (e.g., indicated by higher layer parameter/signaling). Therefore, the wireless communication device may determine the $n_{offset}$ to have a value of 0 (e.g., in the absence of higher layer signaling providing/specifying one or more candidate values for the $n_{offset}$).

In some embodiments, the wireless communication device may determine at least one value of the $n_{offset}$ according to a hopping pattern/sequence. The wireless communication device may determine the value(s) of the offset (e.g., based on a hopping pattern) at a granularity of symbol level, slot level, resource level, resource set level and/or frequency hopping period in time domain. The wireless communication device can determine the value(s) of the $n_{offset}$ according to a hopping pattern represented by:

$$n_{offset} = (n'_{offset} + k') \bmod P_F$$

In some embodiments, $n_{offset}$ may include or correspond to an offset component. The value of the $n_{offset}$ and/or the $P_F$ may be configured via RRC signaling (or other types of higher layer signaling). The parameter k' may specify/indicate/correspond to a hopping sequence value. In some embodiments, the k' may change (or be adjusted) according to at least one of the following hopping sequences:

1) k'={0, 1} if $P_F$ is equal to 2
2) k'={0, 2, 1} if $P_F$ is equal to 3
3) k'={0, 2, 1, 3} if $P_F$ is equal to 4
4) k'={0, 4, 2, 6, 1, 5, 3, 7} if $P_F$ is equal to 8

In some embodiments, the granularity of the hopping pattern may be a frequency hopping period in the time domain. If the granularity of the hopping pattern is a frequency hopping period in the time domain, a change in the k' may occur after the SRS transmissions have undergone a whole round of hopping in frequency domain.

In some embodiments, the parameter $k_F$ may indicate/specify/provide a frequency domain shift value for partial frequency SRS transmissions. The wireless communication device may obtain/determine the value of the $k_F$ according to (or by using) at least one of following methods:

1) The wireless communication device may determine/configure/identify/select the value of the $k_F$ according to (or based on) higher layer signaling (e.g., RRC signaling and/or MAC-CE signaling). For instance, the $k_F$ may be configured with at least one value of $k_F \in \{1, 2, \ldots, P_F\}$ from higher layer signaling.
2) The wireless communication device may determine the value of the $k_F$ by receiving, via higher layer signaling (e.g., RRC and/or MAC-CE signaling), a configuration. The configuration may indicate/provide/specify a plurality of candidate values. For instance, the wireless communication device may determine at least one value of the $k_F$ from the plurality of candidate values indicated by the received configuration. Responsive to receiving the configuration (e.g., the plurality of candidate values), the wireless communication device may determine the value of the $k_F$ according to (or by using) a DCI. For example, the wireless communication device may receive the DCI, wherein the DCI can indicate/provide/specify the value of the $k_F$ from the plurality of candidate values.

3) In some embodiments, the value of the $k_F$ (and/or $P_F$) may not be configured with a plurality of candidate values and/or at least one value (e.g., indicated by higher layer parameter/signaling). Therefore, the wireless communication device may determine the $k_F$ to have a value of 1 (e.g., in the absence of higher layer signaling providing/specifying one or more candidate values for the $k_F$).

In some embodiments, the wireless communication device may determine at least one value of the $k_F$ according to a hopping pattern/sequence. The wireless communication device may determine the value(s) of the $k_F$ (e.g., based on a hopping pattern) at a granularity of symbol level, slot level, resource level, resource set level and/or frequency hopping period in time domain. The wireless communication device can determine the value(s) of the $k_F$ according to a hopping pattern represented by:

$$k_F = (k'_F + k') \bmod P_F$$

In some embodiments, the value of the $k_F$ and/or the $P_F$ may be configured (e.g., configured by the wireless communication node) via RRC signaling (or other types of higher layer signaling). The parameter k' may specify/indicate/correspond to a hopping sequence value. In some embodiments, the k' may change (or be adjusted) according to at least one of the following hopping sequences:

1) k'=10, 11 if $P_F$ is equal to 2
2) k'={0, 2, 1} if $P_F$ is equal to 3
3) k'={0, 2, 1, 3} if $P_F$ is equal to 4
4) k'={0, 4, 2, 6, 1, 5, 3, 7} if $P_F$ is equal to 8

In some embodiments, the granularity of the hopping pattern may be a frequency hopping period in the time domain. If the granularity of the hopping pattern is a frequency hopping period in the time domain, a change/modification in the k' may occur after the SRS transmissions have undergone a whole round of hopping in the frequency domain.

II. Scheme B

Certain systems (e.g., NR Rel-15) may support triggering (e.g., by a wireless communication node) aperiodic SRS resource set(s) with DCI to enable dynamic UL/DL channel measurements. However, current system support for triggering aperiodic SRS resource set(s) with DCI can be restrictive. The restrictions can cause congestion of PDCCH, DCI and/or reference signal (RS) overhead, and/or excessive power consumption by the wireless communication device (e.g., UE). Possible solutions for these problems can include enhancing the flexibility of the network when triggering aperiodic SRSs.

In some embodiments, a given aperiodic SRS resource set can be transmitted/sent/broadcasted/communicated in a (t+1)-th available slot relative to a reference slot. The parameter t may specify/indicate/provide a value of a slot offset for a resource set. In some embodiments, the parameter t may be indicated/specified/provided via DCI and/or RRC signaling (e.g., if only one value of t is configured via RRC signaling). In some embodiments, the candidate values of t may include 0 (or other values). In some embodiments, the reference slot may be defined/configured according to the following options:

Option 1: The reference slot may include or correspond to the slot with the triggering DCI.

Option 2: The reference slot may include or correspond to the slot indicated by a defined triggering offset (e.g., legacy triggering offset).

In some embodiments, option 1 may be a subset of option 2. Certain embodiments may adopt option 2 to define/configure the reference slot, while option 1 can be a basic feature for supporting triggering offset enhancement. For example, a capability of the wireless communication device may support triggering offset enhancement to determine/identify/configure a SRS transmission slot according to a reference slot within which DCI that triggers the SRS is received (e.g., option 1). In some embodiments, the wireless communication device may report/specify/indicate (e.g., via a reporting message) whether the wireless communication device supports a defined triggering offset being configured with at least one non-zero value. The wireless communication device may support the defined triggering offset being configured with at least one non-zero value when triggering offset enhancement (e.g., Rel-17 triggering offset enhancement) is used (e.g., to determine SRS transmission slot).

In some embodiments, the capability of the wireless communication device may fail to support (or the wireless communication device may fail to report supporting) the defined triggering offset being configured with at least one non-zero value. If the capability of the wireless communication device fails to support the defined triggering offset being configured with at least one non-zero value, the defined triggering offset may be configured using a zero value. For instance, the defined triggering offset may be configured using a zero value when triggering offset enhancement is used to determine the SRS transmission slot (e.g., when a list of slot offset values t is configured). In this example, the slot with the triggering DCI may include or correspond to the reference slot.

In some embodiments, the capability of the wireless communication device may support (or the wireless communication device may report supporting) the defined triggering offset being configured with at least one non-zero value. If the capability of the wireless communication device supports the defined triggering offset being configured with at least one non-zero value, the defined triggering offset may be configured using a non-zero value. For instance, the defined triggering offset may be configured using a non-zero value when triggering offset enhancement is used to determine the SRS transmission slot (e.g., when a list of slot offset values t is configured). In this example, the slot indicated by the defined triggering offset (e.g., legacy triggering offset) may include or correspond to the reference slot.

A. Capability of the Wireless Communication Device for the Values of the Slot Offset (t)

A wireless communication node may configure one or more values of a slot offset (t) for a resource set via RRC signaling (or other types of higher layer signaling). In some embodiments, the wireless communication device may report/provide (e.g., via a reporting message to the wireless communication node) a maximum number of values of the slot offset (t) for a resource set. In some embodiments, the wireless communication device may report/specify/indicate a maximum value of the t for the resource set. A SRS resource set can be transmitted/communicated in a (t+1)-th available slot relative to the reference slot.

B. DCI Indication for the Values of the Slot Offset (t)

In some embodiments, DCI (e.g., DCI format 0_1/0_2 without data and/or CSI) may support options of using/repurposing an unused field and/or using/defining/configuring a dedicated field (e.g. a new field) of the DCI, to indicate/specify/provide at least one value of a slot offset (t) for a resource set. If the dedicated field is configured to indicate (e.g., indicate by the wireless communication node) the at least one value of the t, the wireless communication device may ignore (e.g., not be expected to repurpose) the unused field. If the unused field is configured to indicate the at least one value of the t, the wireless communication device may ignore (e.g., not be expected to find) the dedicated field of the DCI.

III. Scheme C

In some embodiments (e.g., for aperiodic antenna switching SRS), the capability of the wireless communication device may support configuring N<=N_max resource sets. The value of N_max may indicate/specify/provide a maximum number of configured resource sets. The value of N may indicate a number of resource sets (N) to be configured by the wireless communication device. The wireless communication device may report/specify/indicate the value of N_max and/or the value of N. In some embodiments, at least K resources can be distributed in the N resource sets based on a RRC configuration.

In some embodiments, for 1T6R, K=6, N_max=[4], and/or each resource has 1 port.
In some embodiments, for 1T8R, K=8, N_max=[4], and/or each resource has 1 port.
In some embodiments, for 2T6R, K=3, N_max=[3], and/or each resource has 2 ports.
In some embodiments, for 2T8R, K=4, N_max=[4], and/or each resource has 2 ports.
In some embodiments, for 4T8R, K=2, N_max=[2], and/or each resource has 4 ports.
The number of supported candidate values of N for each xTyR remains for future study.

In some embodiments (e.g., for each supported xTyR), the wireless communication device may report/provide/specify/indicate (e.g., via a reporting message) the value of the N_max and/or the number of supported values for a number of resource sets (N) to be configured by the wireless communication device. For instance, the wireless communication device may report/specify/indicate whether the capability of the wireless communication device provides support for configuring one or more values of N. In some embodiments, the wireless communication device may report/inform the supported values for N.

IV. Scheme D

In some embodiments, certain systems (e.g., Rel-17) may enhance/improve/increase the capacity and/or coverage of the SRS according to (or based on) at least one of the following options:
Option 1: Increase the maximum number of repetition symbols in one slot and/or one SRS resource.
Option 2: Support SRS transmissions in partial contiguous resource blocks (RBs) in at least one orthogonal frequency-division multiplexing (OFDM) symbol.
Option 3: Introduce support of Comb 8.

A. Option 1: For Increased Repetition

In some embodiments, the wireless communication device can maintain phase continuity during the number of repetition symbols. The wireless communication device (e.g., UE) may report/specify/indicate (e.g., via a reporting message) a maximum number of repetition symbols in an SRS resource. For example, the wireless communication device may report (e.g., to the wireless communication node) the maximum number of repetition symbols across which the wireless communication device can maintain phase continuity.

B. Options 2 and 3: For Partial Frequency SRS Transmissions and Comb 8

In some embodiments, the wireless communication device may perform/enable power boosting for resource block level partial frequency sounding (RPFS) and/or Comb 8. The wireless communication device may report/specify/indicate a maximum comb value, a maximum value of power boosting for RPFS, and/or a maximum value of the partial frequency factor ($P_F$). For instance, the wireless communication device may report the maximum value of power boosting and the maximum comb value. In another example, the wireless communication device may report the maximum value of the $P_F$, the maximum comb value, and the maximum value of power boosting. In yet another example, the wireless communication device may report/indicate the maximum value of the $P_F$ and the maximum comb value. A comb value may specify/indicate a number of subcarriers from a total number of subcarriers in a RB (e.g., 12 subcarriers) that is used to transmit at least one SRS. In some embodiments, the $P_F$ may be reported per range of m_SRS (the RB number of SRS transmission in frequency domain). In some embodiments, the wireless communication device may report/provide the minimum number of SRS RBs in a hop and/or an OFDM symbol. In some embodiments, the wireless communication device may report (e.g., to the wireless communication node) the minimum number of SRS subcarriers in a hop and/or an OFDM symbol.

V. Scheme E

In some embodiments, a transmit power control (TPC) command of the DCI can be used for SRS power control. Usage of the TPC command can avoid large fluctuations/variations of SRS power between symbols, resources and/or resource sets. In some embodiments, one or more rules can be predefined/predetermined/configured between the wireless communication node and the wireless communication device:

1) The wireless communication device may be expected to receive/obtain a same TPC command between SRS repetition symbols.
If the wireless communication device receives different/separate/distinct TPC command values on different/separate/distinct SRS repetition symbols, the value of the TPC command on the first SRS repetition symbol may be applied to other SRS repetition symbols included in the same slot, SRS resource, and/or SRS resource set. If different/distinct TPC command values are demodulated on different SRS repetition symbols, the TPC command value on the first SRS repetition symbol may be applied to other SRS repetition symbols included in the same slot, SRS resource, and/or SRS resource set. If different TPC command values are applied to different SRS repetition symbols, the TPC command value on the first SRS repetition symbol may be applied to other SRS repetition symbols included in the same slot, SRS resource, and/or SRS resource set.
The wireless communication device may not be expected to receive/obtain a TPC command value and/or apply a new value of the TPC command on a plurality of SRS repetition symbols (on time domain). The plurality of SRS repetition symbols can be included in a same slot, SRS resource, and/or SRS resource set.

2) The wireless communication device may be expected to receive/obtain a same TPC command between SRS resources in a same SRS resource set.

If the wireless communication device receives different/separate/distinct TPC command values on different/separate SRS resources in the same SRS resource set, the value of the TPC command on the first SRS resource may be applied to other SRS resources included in the same SRS resource set. If different/separate TPC command values are demodulated on different SRS resources in the same SRS resource set, the value of the TPC command on the first SRS resource may be applied to other SRS resources included in the same SRS resource set. If different TPC command values are applied to different SRS resources in the same SRS resource set, the value of the TPC command on the first SRS resource may be applied to other SRS resources included in the same SRS resource set.

The wireless communication device may not be expected to receive/obtain a TPC command value and/or apply a new value of the TPC command on a plurality of SRS resources included in the same SRS resource set.

3) The wireless communication device may be expected to receive/obtain a same TPC command between different SRS resource sets when a usage parameter (e.g., in SRS-ResourceSet) of the wireless communication device is configured via higher layer signaling as 'antennaSwitching'. For example, the wireless communication device may be configured with a configuration of 't1r4' for 1T4R, or 't1r8' for 1T8R (e.g., depending on the capability of the wireless communication device).

If the wireless communication device receives/obtains different TPC command values on different SRS resource sets, the value of the TPC command on the first SRS resource set can be applied to other SRS resource sets belonging to the same usage. If different/separate TPC command values are demodulated on different SRS resource sets, the value of the TPC command on the first SRS resource set can be applied to other SRS resource sets belonging to the same usage. If different TPC command values are applied to different SRS resource sets, the value of the TPC command on the first SRS resource set can be applied to other SRS resource sets belonging to the same usage.

The wireless communication device may not be expected to receive/obtain a TPC command value and/or apply a new value of the TPC command on a plurality of SRS resource sets belonging to the same usage (on time domain).

VI. Scheme F

In some embodiments, the wireless communication device and/or the wireless communication node may support one or more of the following configurations (e.g., to improve/enhance the flexibility of the configuration). The parameter N_symbol may provide/specify/indicate a total number of OFDM symbols in one SRS resource. In some embodiments, the parameter R may include or correspond to a repetition factor.

N_symbol=8, R=2
N_symbol=8, R=4
N_symbol=8, R=8
N_symbol=10, R=2
N_symbol=10, R=10
N_symbol=12, R=2
N_symbol=12, R=4
N_symbol=12, R=12
N_symbol=14, R=2
N_symbol=14, R=14

In some embodiments, the ratio of N_symbol and R may provide an integer value. In some embodiments, higher layer signaling (e.g., RRC and/or MAC-CE signaling) and/or DCI can indicate/provide/specify the value of the N_symbol and/or R. For example, the above 10 configurations can be indicated/specified by using at least 4 bits (or other numbers of bits) of the RRC signaling (or other types of signaling). In some embodiments, the configuration corresponding to N_symbol=10, R=5 can be indicated by the signaling.

VII. Scheme G

In some embodiments, a plurality of transmit (Tx) switching configurations may be supported. In some embodiments, the wireless communication device may report supporting a plurality of Tx switching configurations (e.g., both 1T8R and 1T6R are supported). At least two methods can be used to determine a Tx switching configuration for the wireless communication device.

A. Method 1

A plurality of SRS resource sets may be divided/partitioned/organized/classified into at least two groups, corresponding to 1T8R and 1T6R respectively. For example, a first SRS resource set group may correspond to 1T8R, while a second SRS resource set group may correspond to 1T6R. For each SRS resource set, at least one RRC parameter may be used to link/associate either 1T8R or 1T6R. In some embodiments, at least one RRC parameter may be used to label/classify the SRS resource sets corresponding to 1T6R, and/or the SRS resource sets corresponding to 1T8R. The wireless communication node may indicate the label/classification in the DCI (e.g., to reduce DCI overhead).

B. Method 2

In some embodiments, the wireless communication device may determine whether the SRS resource set(s) and/or resource(s) correspond to 1T6R or 1T8R based on (or according to) the number/amount of resource sets and/or resources triggered by the wireless communication node.

VIII. Scheme H

The wireless communication device may indicate/specify/report whether the wireless communication device supports being configured with a same SRS resource and/or SRS resource set for a plurality of usages. If the wireless communication device fails to report such a capability, keep other behavior (e.g., Rel-15 and/or Rel-16 behavior). In some embodiments, a RRC parameter (or other parameters) can be used to enable this feature for all possible sets, without defining a parameter (e.g., a RRC parameter) for each resource set. Whether particular resources/resource sets are used for multiple usages may depend on the configuration of the wireless communication node, based on whether a same set ID and/or resources are used for different usages.

IX. Sounding Reference Signal Transmission

Figure 4:
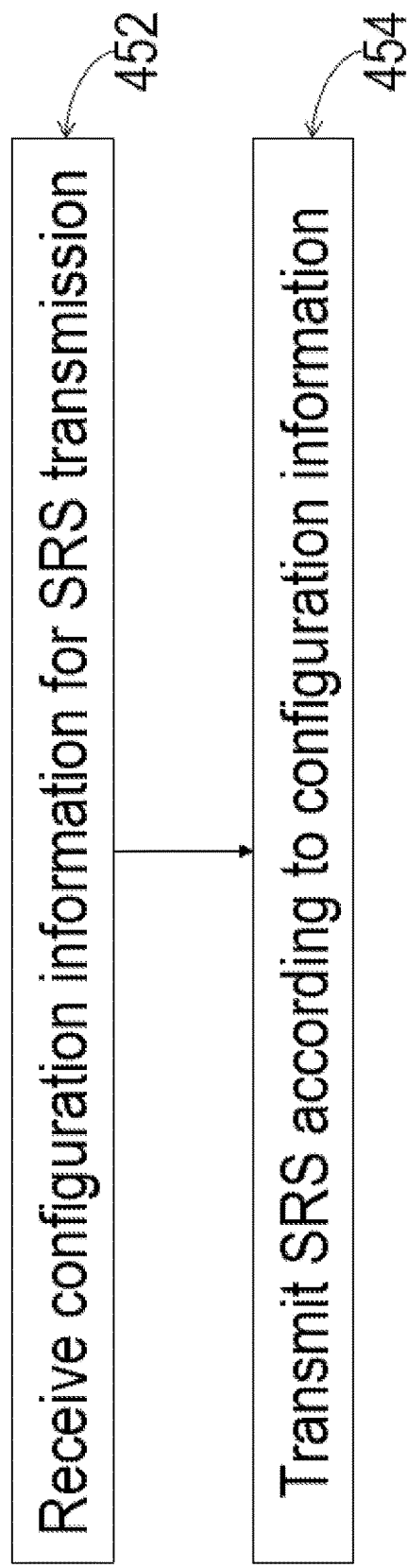
FIG. 4 illustrates a flow diagram of an example method for sounding reference signal transmission, in accordance with an embodiment of the present disclosure.

FIG. 4 illustrates a flow diagram of a method 450 for sounding reference signal transmission. The method 450 may be implemented using any of the components and devices detailed herein in conjunction with FIGS. 1-3. In overview, the method 450 may include receiving configuration information for SRS transmission (452). The method 450 may include transmitting the SRS according to configuration information (454).

Referring now to operation (452), and in some embodiments, a wireless communication device (e.g., a UE) may receive/obtain/acquire configuration information for SRS transmission from a wireless communication node (e.g., gNB). The wireless communication node may send/transmit/broadcast/communicate the configuration information to the wireless communication device. In some embodiments, the wireless communication device may determine/configure/identify a starting position in frequency domain for transmitting the SRS. The wireless communication device may determine the starting position according to (or based on) an offset parameter ($n_{offset}$), a partial frequency factor ($P_F$), and/or other information. In some embodiments, the wireless communication device may transmit/send the SRS as a partial frequency SRS transmission.

In some embodiments, the wireless communication device may determine/identify/configure the starting position as a function of a ratio of the $n_{offset}$ and the $P_F$ (e.g., $n_{offset} m_{SRS,B_{SRS}} N_{SC}^{RB}/P_F$) In some embodiments, the wireless communication device may determine/configure/identify/select a value of the $P_F$ from a predetermined list of values (e.g., from {2, 3, 4, 8} and/or from {2, 4, 8}). In some embodiments, the wireless communication device may determine a value of the $P_F$ by receiving/obtaining a configuration indicating/specifying/providing a plurality of candidate values. The wireless communication device may receive the configuration via higher layer signaling (e.g., RRC signaling, MAC-CE signaling, and/or other types of signaling). In some embodiments, the wireless communication device may determine a value of the $P_F$ by receiving/obtaining/analyzing DCI (or other information). The DCI may indicate/specify/provide/identify the value of the $P_F$ from the plurality of candidate values.

In some embodiments, higher layer signaling (e.g., RRC signaling) may fail to provide/specify/indicate one or more candidate values for the $P_F$. In the absence of higher layer signaling providing one or more candidate values for the $P_F$, the wireless communication device may determine the $P_F$ to have a value of 1 (or other values). In some embodiments, the wireless communication device may determine/identify/configure a value of the $n_{offset}$ (or other values) from (or according to) higher layer signaling. In some embodiments, the wireless communication device may determine a value of the $n_{offset}$ by receiving/obtaining a configuration. The configuration may indicate/specify/provide a plurality of candidate values. The wireless communication device may receive the configuration via higher layer signaling (e.g., RRC signaling or other types of signaling). In some embodiments, the wireless communication device may determine a value of the $n_{offset}$ by receiving/obtaining/analyzing DCI. The DCI may indicate/provide/specify the value of the $n_{offset}$ from (or according to) the plurality of candidate values. In some embodiments, higher layer signaling may fail to provide/indicate one or more candidate values for the $n_{offset}$. In the absence of higher layer signaling providing one or more candidate values for the $n_{offset}$ the wireless communication device may determine the $n_{offset}$ to have a value of 0 (or other values).

In some embodiments, the wireless communication device may determine at least one value of the $n_{offset}$ according to (or based on) a hopping pattern at a certain granularity. The certain granularity may include or correspond to symbol level, slot level, resource level, resource set level and/or frequency hopping period in time domain. The hopping pattern can be represented by: $n_{offset}=(n'_{offset}+k')$ mod $P_F$. In some embodiments, the $n_{offset}$ may include or correspond to an offset component. The $n'_{offset}$ can be configured via RRC signaling (and/or other types of signaling). In some embodiments, k' may be a hopping sequence value. In some embodiments, the k' may change according to (or based on) a hopping sequence of {0, 1} if $P_F$ is equal to 2 (or other values). In some embodiments, the k' may change according to (or based on) a hopping sequence of {0, 2, 1} if $P_F$ is equal to 3 (or other values). In some embodiments, the k' may change according to a hopping sequence of {0, 2, 1, 3} if $P_F$ is equal to 4 (or other values). In some embodiments, the k' may change according to a hopping sequence of {0, 4, 2, 6, 1, 5, 3, 7} if $P_F$ is equal to 8 (or other values). In some embodiments, the hopping pattern associated/related with the offset may be at a granularity of the frequency hopping period in time domain. If the hopping pattern associated with the $n_{offset}$ is at a granularity of the frequency hopping period in time domain, a change/modification/adjustment in the k' may occur after SRS transmissions have undergone a whole round of hopping in frequency domain.

In some embodiments, the wireless communication device may transmit/send/communicate a reporting message to the wireless communication node prior to receiving the configuration information. In some embodiments, the reporting message may indicate/specify/provide a capability of the wireless communication device. In some embodiments, the capability may include supporting triggering offset enhancement. The capability can include supporting triggering offset enhancement to determine/configure a SRS transmission slot according to (or based on) a reference slot within which DCI that triggers/causes the SRS (e.g., aperiodic SRS) is received. In some embodiments, triggering offset enhancement may be used. When triggering offset enhancement is used, the reporting message may include/provide/specify an indication of whether the wireless communication device supports a defined triggering offset (e.g., legacy triggering offset) being configured with at least one non-zero value.

In some embodiments, the reporting message may exclude/omit any indication of support for the defined triggering offset being configured with at least one non-zero value. When the reporting message excludes any indication of support for the defined triggering offset being configured with at least one non-zero value, the defined triggering offset may be configured using a zero value. In some embodiments, the reporting message may include/provide/specify an indication of support for the defined triggering offset being configured with at least one non-zero value. When the reporting message includes/provides an indication of support for the defined triggering offset being configured with at least one non-zero value, the defined triggering offset may be configured using a non-zero value. In some embodiments, the reporting message may include/specify/provide/indicate a maximum number of values of a slot offset (t) for a resource set. In some embodiments, the reporting message may include/indicate/provide a maximum value of the t for the resource set. In some embodiments, a SRS resource set may be transmitted/sent/communicated in a (t+1)-th available slot relative to the reference slot.

In some embodiments, the DCI may support options of using an unused field and/or using a dedicated field (e.g., a new dedicated field), to indicate/specify/provide at least one value of a slot offset (t) for a resource set. In some embodiments, the wireless communication device may ignore the unused field, if the dedicated field is configured to indicate/provide/specify the at least one value of the t. In some embodiments, the wireless communication device may ignore the dedicated field, if the unused field is configured to indicate/specify the at least one value of the t. In some embodiments, the reporting message may include/specify/indicate at least one of: a maximum number of configured resource sets (N_max), and/or a number of supported values for a number of resource sets (N) to be configured by the wireless communication device, where N≤N_max. In some embodiments, the reporting message may include/provide/ specify/indicate a maximum number of repetition symbols across which the wireless communication device can maintain phase continuity. In some embodiments, the reporting message may include at least one of: a maximum value of a partial frequency factor ($P_F$), a maximum comb value, and/or a maximum value of power boosting.

In some embodiments, the wireless communication device may be expected to receive/obtain a same/corresponding TPC command between SRS repetition symbols. In some embodiments, the wireless communication device may be expected to receive/obtain a same/corresponding TPC command between SRS resources in a same SRS resource set. In some embodiments, the wireless communication device may be expected to receive/obtain a same TPC command between different/distinct/separate SRS resource sets when a usage parameter of the wireless communication device is configured via higher layer signaling (e.g., RRC signaling or other types of signaling) as 'antennaSwitching'.

Referring now to operation (454), and in some embodiments, the wireless communication device may transmit/send/broadcast/communicate a SRS to the wireless communication node according to (or based on) the configuration information. The wireless communication node may receive/obtain the SRS from the wireless communication device according to (or based on) the configuration information. In some embodiments, the configuration information can be received/obtained from the wireless communication node via RRC signaling, MAC CE signaling, DCI transmission, and/or other types of signaling/transmissions. In some embodiments, the configuration information may include/provide/specify an indication of: a total number of OFDM symbols in one SRS resource (N_symbol), and/or a repetition factor (R). In some embodiments, a ratio of N_symbol and R provides an integer value. In some embodiments, the configuration information may be received/obtained from the wireless communication node via RRC signaling (or other types of higher layer signaling). In some embodiments, the RRC signaling may include/provide/specify at least one indicator to associate/link/label one of a plurality of transmission switching configurations (e.g., Tx switching configurations, such as 1T8R and 1T6R) to at least one SRS resource and/or SRS resource set.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
receiving, by a wireless communication device from a wireless communication node, configuration information for sounding reference signal (SRS) transmission; and
transmitting, by the wireless communication device to the wireless communication node, a SRS according to the configuration information; and
determining, by the wireless communication device according to an offset parameter ($n_{offset}$) and a partial frequency factor ($P_F$), a starting position in frequency domain for transmitting the SRS, the $P_F$ configured via a higher layer signaling or a default value.

2. The method of claim 1, wherein the starting position in the frequency domain is for transmitting the SRS as a partial frequency SRS transmission.

3. The method of claim 1, comprising:
determining, by the wireless communication device, the starting position as a function of a ratio of the $n_{offset}$ and the $P_F$.

4. The method of claim 1, comprising:
determining, by the wireless communication device, the $P_F$ to have the default value of 1, in the absence of the higher layer signaling providing one or more candidate values for the $P_F$.

5. The method of claim 1, comprising:
determining, by the wireless communication device, at least one value of the $n_{offset}$ according to a hopping pattern at a granularity of frequency hopping period in time domain, the hopping pattern represented by:

$$n_{offset} = (n_{offset}' + k') \bmod P_F,$$

wherein $n_{offset}'$ is an offset component configured via radio resource configuration (RRC) signaling, and k' is a hopping sequence value.

6. The method of claim 5, wherein the k' changes according to a hopping sequence of:
{0, 1} if $P_F$ is equal to 2, or
{0, 2, 1, 3} if $P_F$ is equal to 4.

7. A method comprising:
transmitting, by a wireless communication node to a wireless communication device, configuration information for sounding reference signal (SRS) transmission; and
receiving, by the wireless communication node from the wireless communication device, a SRS according to the configuration information,
wherein a starting position in frequency domain for transmitting the SRS is determined according to an offset parameter ($n_{offset}$) and a partial frequency factor ($P_F$), the $P_F$ configured via a higher layer signaling or a default value.

8. The method of claim 7, wherein the starting position in the frequency domain is for transmitting the SRS as a partial frequency SRS transmission.

9. The method of claim 7, wherein the starting position is determined as a function of a ratio of the $n_{offset}$ and the $P_F$.

10. The method of claim 7, wherein the $P_F$ is determined to have the default value of 1, in the absence of the higher layer signaling providing one or more candidate values for the $P_F$.

11. The method of claim 7, wherein at least one value of the $n_{offset}$ is determined according to a hopping pattern at a granularity of frequency hopping period in time domain, the hopping pattern represented by:

$$n_{offset} = (n_{offset}' + k') \bmod P_F,$$

wherein $n_{offset}'$ is an offset component configured via radio resource configuration (RRC) signaling, and k' is a hopping sequence value.

12. The method of claim 11, wherein the k' changes according to a hopping sequence of:
{0, 1} if $P_F$ is equal to 2, or
{0, 2, 1, 3} if $P_F$ is equal to 4.

13. A wireless communication node, comprising:
at least one processor configured to:
transmit, via a transceiver to a wireless communication device, configuration information for sounding reference signal (SRS) transmission;
receive, via the transceiver from the wireless communication device, a SRS according to the configuration information,
wherein a starting position in frequency domain for transmitting the SRS is determined according to an offset parameter ($n_{offset}$) and a partial frequency factor ($P_F$), the $P_F$ configured via a higher layer signaling or a default value.

14. The wireless communication node of claim 13, wherein the starting position in the frequency domain is for transmitting the SRS as a partial frequency SRS transmission.

15. A wireless communication device, comprising:
at least one processor configured to:
receive, via a transceiver from a wireless communication node, configuration information for sounding reference signal (SRS) transmission;
transmit, via the transceiver to the wireless communication node, a SRS according to the configuration information; and determine, according to an offset parameter ($n_{offset}$) and a partial frequency factor ($P_F$), a starting position in frequency domain for transmitting the SRS, the $P_F$ configured via a higher layer signaling or a default value.

16. The wireless communication device of claim 15, wherein the starting position in the frequency domain is for transmitting the SRS as a partial frequency SRS transmission.

17. The wireless communication device of claim 15, wherein the at least one processor is configured to:
determine the starting position as a function of a ratio of the $n_{offset}$ and the $P_F$.

18. The wireless communication device of claim 15, wherein the at least one processor is configured to:
determine the $P_F$ to have the default value of 1, in the absence of the higher layer signaling providing one or more candidate values for the $P_F$.

19. The wireless communication device of claim 15, wherein the at least one processor is configured to:
determine at least one value of the $n_{offset}$ according to a hopping pattern at a granularity of frequency hopping period in time domain, the hopping pattern represented by:

$$n_{offset} = (n_{offset}' + k') \bmod P_F,$$

wherein $n_{offset}'$ is an offset component configured via radio resource configuration (RRC) signaling, and k' is a hopping sequence value.

20. The wireless communication device of claim 19, wherein the k' changes according to a hopping sequence of:
{0, 1} if $P_F$ is equal to 2, or
{0, 2, 1, 3} if $P_F$ is equal to 4.

* * * * *